(12) United States Patent
Parihar et al.

(10) Patent No.: US 12,238,537 B2
(45) Date of Patent: **\*Feb. 25, 2025**

(54) DYNAMIC RADIO ARCHITECTURE BEAM PATTERN CONTROL

(71) Applicant: T-MOBILE INNOVATIONS LLC, Overland Park, KS (US)

(72) Inventors: Vanil Parihar, Prosper, TX (US); Nitesh Manchanda, McKinney, TX (US); Sharath Somashekar, Overland Park, KS (US); Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 428 days.

This patent is subject to a terminal disclaimer.

(21) Appl. No.: 17/687,601

(22) Filed: Mar. 4, 2022

(65) Prior Publication Data
US 2022/0191711 A1      Jun. 16, 2022

Related U.S. Application Data

(63) Continuation of application No. 16/512,096, filed on Jul. 15, 2019, now Pat. No. 11,304,066.

(51) Int. Cl.
*H04W 16/28*      (2009.01)
*H04W 72/044*     (2023.01)
*H04W 76/11*      (2018.01)
*H04W 84/04*      (2009.01)

(52) U.S. Cl.
CPC ......... *H04W 16/28* (2013.01); *H04W 72/046* (2013.01); *H04W 76/11* (2018.02); *H04W 84/042* (2013.01)

(58) Field of Classification Search
CPC ... H04W 16/28; H04W 72/046; H04W 76/11; H04W 84/042
See application file for complete search history.

(56) References Cited

U.S. PATENT DOCUMENTS

| | | | |
|---|---|---|---|
| 10,439,681 B1 | 10/2019 | El Chebib et al. | |
| 10,505,616 B1 | 12/2019 | Chen et al. | |
| 2002/0034967 A1 | 3/2002 | Taniguchi et al. | |
| 2004/0009776 A1 | 1/2004 | Ishikawa et al. | |
| 2006/0121918 A1 | 6/2006 | Nakakita et al. | |
| 2012/0004010 A1 | 1/2012 | Tamura et al. | |
| 2018/0227900 A1 | 8/2018 | Akkarakaran et al. | |
| 2018/0249453 A1 | 8/2018 | Nagaraja et al. | |
| 2019/0020402 A1* | 1/2019 | Gharavi | H04B 7/1555 |
| 2019/0312619 A1* | 10/2019 | Abedini | H04B 7/0695 |

(Continued)

*Primary Examiner* — Sharmin Chowdhury
(74) *Attorney, Agent, or Firm* — SHOOK, HARDY & BACON L.L.P.

(57) ABSTRACT

Methods and systems are provided for dynamically adjusting broadcast beam patterns of a wavefront emitted by an antenna array based on the types of devices communicatively coupled to the base station associated with the antenna array. The broadcast beam patterns can be adjusted by modifying the broadcast mode or at least one phase, amplitude, or power of the at least one antenna associated with the base station. Adjusting the beam pattern, for example between multiple beams and a single unified beam, based on device types can improve the quality of service for the devices and reduce the processing burden of the base station.

20 Claims, 6 Drawing Sheets

(56) References Cited

U.S. PATENT DOCUMENTS

| | | |
|---|---|---|
| 2019/0319686 A1 | 10/2019 | Chen, IV et al. |
| 2019/0326976 A1 | 10/2019 | Hu et al. |
| 2019/0372630 A1 | 12/2019 | Brunel et al. |
| 2020/0045053 A1 | 2/2020 | Xu et al. |
| 2020/0178334 A1 | 6/2020 | Karimli et al. |

* cited by examiner

DYNAMIC RADIO ARCHITECTURE BEAM PATTERN CONTROL

CROSS-REFERENCE TO RELATED APPLICATIONS

This application is a continuation of co-pending U.S. patent application Ser. No. 16/512,096, filed Jul. 15, 2019, entitled "Dynamic Radio Architecture Beam Pattern Control," the entirety of which is incorporated herein by reference.

BRIEF SUMMARY

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Traditional telecommunications networks can rely on a predetermined beam pattern, which can be thought of as the shape or shapes of the wavefront emitted by an antenna array. Generally, beam patterns are facilitated using multiple antennas to control the direction of a wavefront by appropriately weighting the amplitude, power, and phase of individual antenna signals. When assembled into an antenna array, the multiple antennas can create multiple individually-identifiable beams, a unified beam, or a combination of the two (hybrid beam). While a properly enabled device, such as a cell phone, is within or at least partially within the beam, the cell phone can connect to a telecommunications network facilitated by the antenna array. However, the proliferation of devices that can connect with and exchange information with telecommunication networks has revealed limitations in traditional networks. For example, communication between a traditional telecommunication network access point and traditional types of devices require relatively little processing capacity of the access point, thereby enabling the access point to maintain more processing intense beam patterns. However, some newer types of devices such as relays, fixed location sensors, femto cells, and others require comparatively more processing by the access point. Accordingly, the present disclosure is directed, in part, to dynamically switching an antenna array's broadcast beam pattern between multi-beam, unified beam, and other patterns based on the types of devices communicatively coupled with the telecommunication network facilitated by the antenna array.

For example, some aspects of the present disclosure are directed to methods, systems, and processes of dynamic beam pattern switching based on reported device type. Some embodiments described herein comprise receiving a device type indication from a first device and determining a first broadcast beam pattern for a communication tower based on the device type indication. The first broadcast beam pattern is applied to at least one antenna array associated with the communication tower. Device type identifiers can include information transmitted by a device to the communication tower (e.g., access point 114) such as a public land mobile network number or quality of service class identifier. Additionally, in some embodiments described herein, the first broadcast beam pattern is based on detecting the current broadcast beam pattern of the communication tower.

Additionally, or alternatively, some embodiments described herein comprise receiving a plurality of device type identifiers from a set of devices, each device type identifier of the plurality of device type identifiers corresponding to a device of the set of devices and analyzing the plurality of device type identifiers and the current broadcast beam pattern. In response to, or based on, the analysis a new broadcast beam pattern is determined and applied to at least one antenna associated with a telecommunication tower. Determining the new broadcast beam can include identifying how to modify at least one phase, amplitude, or power of the at least one antenna associated with the telecommunication tower to change the current broadcast beam pattern to the new broadcast beam pattern. A broadcast beam pattern can include one broadcast beam or more than one broadcast beam.

BRIEF DESCRIPTION OF THE DRAWINGS

Illustrative embodiments of the present invention are described in detail below with reference to the attached drawing figures, and wherein.

DETAILED DESCRIPTION

Figure 1:
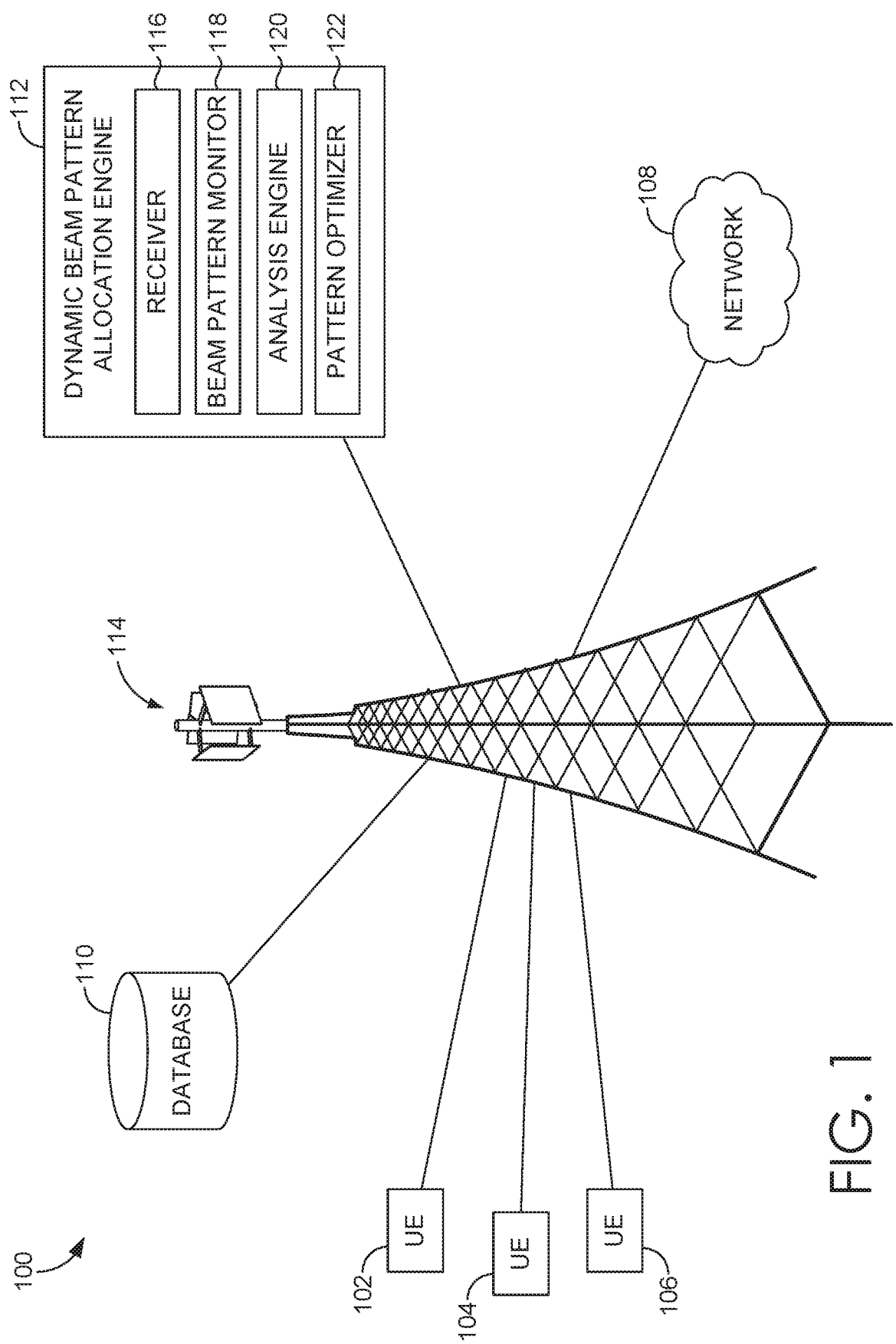
FIG. 1 depicts an example wireless communications network, according to an aspect herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
M IMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment Further, various technical terms are used throughout this description. An illustrative resource that fleshes out various aspects of these terms can be found in Newton's Telecom Dictionary, 25th Edition (2009).

As used herein, user equipment (UE) (also referenced herein as a user device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point. A UE can be, in an embodiment, similar to device 400 described herein with respect to FIG. 4.

Referring to FIG. 1, a network environment suitable for use in implementing embodiments of the present disclosure is provided. Such a network environment as illustrated in FIG. 1 is designated generally as network environment 100. Network environment 100 is but one example of a suitable network environment and is not intended to suggest any limitation as to the scope of use or functionality of the disclosure. Neither should network environment 100 be interpreted as having any dependency or requirement relating to any one or combination of components illustrated.

Network environment 100 includes user devices 102, 104, and 106, access point 114 (which may be a cell site, base station, communication tower, a small cell, or the like), network 108, database 110, and dynamic beam pattern allocation engine 112. In network environment 100, user devices can take on a variety of forms, such as a personal computer (PC), a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 400 of FIG. 4) that communicates via wireless communications with the access point 114 in order to interact with a public or private network. In this regard, the user device can be any mobile computing device that communicates by way of a wireless network, for example, a 1× circuit voice, a 3G network (e.g., CDMA, CDMA2000, WCDMA, GSM, UMTS), a 4G network (WiMAX, LTE, HSDPA), a 5G network, or any other type of network.

As previously mentioned, aspects of the present invention are directed to dynamically adjusting beam patterns based on the type of UE(s) communicating with the base station. Accordingly, in some embodiments, each user device comprises a UE type indicator that identifies the UE's type. The UE type indicator can be included in UE software, firmware, hardware or any combination thereof. For example, in some embodiments a UE type indicator can be stored on a UE subscriber identity module (SIM) card, in the UE's storage media, or as part of the UE's bins or operating system. Example UE type indicators include public land mobile network numbers (PLMN) and quality of service (QoS) class identifiers (QCI). In an example embodiment, user device 102 comprises a micro cell communicatively coupled to a backhaul UE relay which is communicatively coupled to access point 114. As such, other UEs can communicatively couple with the access point 114 indirectly via user device 102. An illustrative example of user device 102 includes Sprint's® Magic Box® and other similar devices.

In some cases, the user devices 102, 104, and 106 in network environment 100 can optionally utilize network 108 to communicate with other computing devices (e.g., a mobile device(s), a server(s), a personal computer(s), etc.) through access point 114. The network 108 may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network 108 can include multiple networks, as well as being a network of networks, but is shown in more simple form so as to not obscure other aspects of the present disclosure.

Continuing, network 108 can be part of a telecommunication network that connects subscribers to their immediate service provider. In some instances, network 108 can be associated with a telecommunications provider that provides services to user devices 102, 104, and 106. For example, network 108 may provide voice, SMS, or data services to user devices corresponding to users that are registered or subscribed to utilize the services provided by a telecommunications provider. Similarly, network 108 may provide services to user devices that correspond to relays, fixed sensors, internet of things (IoT) enabled devices, or any other device that provide connectivity or data to other devices. Network 108 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

Generally, access point 114 is configured to communicate with user devices, such as user devices 102, 104, and 106 that are located within the geographical area, or cell, covered by radio antennas of cell site 114. Access point 114 can include one or more base stations (such as a gNodeB), base transmitter stations, radios, antennas, antenna arrays, power amplifiers, transmitters/receivers, digital signal processors, control electronics, GPS equipment, and the like. Access point 114 can include a wireless communications station that is installed at a fixed location, (e.g., a telecommunication tower) or a mobile base station (e.g., small cell) in some embodiments. In some embodiments, access point 114 also includes or is associated with an LTE System Manager (LSM) configured to manage a master list (e.g., a table) of amplitude weights. The list of amplitude weights may include a plurality of amplitude, phase, and power weights applicable to a plurality of antennas, antenna model numbers, radios, tilt angles of antennas, and the like. The listing may also include amplitude, phase, and power weights applicable to various broadcast configurations, such as multi-beam or unified beam.

Access point 114 can further comprise or be associated with a database 110. Generally, database 110 comprises structured data maintained by access point 114 or a remote server (not depicted) communicatively coupled with access point 114 via network 108. The structured data includes tables identifying and classifying device type indicators. For example, database 110 can include a table of public land mobile network numbers (PLMN) and quality of service (QoS) class identifiers (QCI). Further, database 110 can include a table or set of tables that include power, amplitude, and phase settings corresponding to potential broadcast beam patterns applicable to one or more antenna arrays associated with access point 114. The power, amplitude, and phase settings can include numerical values (e.g., weights) that can be applied to at least one antenna of an antenna array to modify the wavefront emitted by the at least one antenna of an antenna array.

Dynamic beam pattern allocation engine 112 generally facilitates dynamic beam pattern modifications and comprises components that are utilized to monitor UE type indicators associated with UEs, such as user device 102, 104, and 106 that are communicatively coupled to access point 114. In some embodiments, dynamic beam pattern allocation engine 112 comprises receiver 116, beam pattern monitor 118, analysis engine 120, and one or more pattern optimizers 122. Although depicted in FIG. 1 as distinct from access point 114, in some embodiments dynamic beam pattern allocation engine 112 is a subsystem of access point 114 or communicatively coupled to one or more access points 114 via network 108.

The receiver 116 of dynamic beam pattern allocation engine 112 is generally responsible for receiving information from various UEs, such as user devices 102, 104, and 106, which are within the coverage area of access point 114. The information sent from a particular UE to access point 114 includes a UE type indicator that identifies and corresponds to the particular UE's type. For example, user device 102 can transmit a UE type indicator to access point 114 that identifies user device 102 as comprising a UE relay. Receiver 116 can receive, or otherwise access, the UE type indicator associated with user device 102 from access point 114. Similarly, user device 104 can transmit a UE type indicator to access point 114 that identifies user device 104 as comprising a smartphone. Example UE type indicators include public land mobile network numbers (PLMN) and quality of service (QoS) class identifiers (QCI). In some embodiments, the information sent from a UE to access point 114 further comprises location information of the user device and channel quality information that includes information on how good or bad the communication channel quality is. Location information may be based on GPS or other satellite location services, terrestrial triangulation, an access point location, or any other means of obtaining coarse or fine location information. Channel quality information may indicate a realized uplink or downlink transmission data rate, observed signal-to-interference-plus-noise ratio (SINR) or signal strength at the user device, or throughput of the connection. Receiving component 116 may receive this data continuously, intermittently, or periodically, such as, for instance, every two to six hours, twice a day, once a day, or once a week. Longer time periods, such as two weeks to three months, and other periods of time are also contemplated in accordance with aspects disclosed herein. The data received during these periods can be used to provide information relating to the UEs (e.g., user devices 102, 104, and 106) connected to access point 114 at a specific point in time or used to acquire historical patterns of UE locations or densities over time.

Beam pattern monitor 118 is generally responsible for determining a first beam pattern emitted by access point 114. As will be discussed below, a first beam pattern may be considered a first beam pattern in time; that is, the first beam pattern is emitted by access point 114 at a time prior to a time that a second beam pattern is emitted. As used herein, the term beam pattern may be considered to be synonymous with a radiation pattern or RF wavefront at a particular time. The radiation pattern or RF wavefront can be facilitated by manipulating the amplitude, phase, power, or any combination thereof of the signals emitted by one or more antenna arrays included in access point 114 and may be considered to have a 3D shape in the x, y, z planes. For example, a beam pattern can include multiple individually-identifiable beams or a unified beam. Beam pattern monitor 118 can determine the beam pattern of access point 114 by detecting a predefined broadcast mode or the amplitude, phase, and power of the antenna array(s) associated with access point 114.

Analysis engine 120 is generally responsible for combining and processing the information for the various UEs received by receiver 116 and comparing it to the first beam pattern emitted by access point 114 as determined by beam pattern monitor 118. In some embodiments, analysis engine 120 considers the UE type identifiers of the UEs connected to access point 114 and the current beam pattern emitted by access point 114. Analysis engine 120 can also consider any other UE information received by receiver 116. As will be discussed below, analysis engine 120 can activate dynamic beam pattern optimizer 112 based on the analysis of at least the UE type identifiers and the beam pattern.

Pattern optimizer 122 is generally responsible for determining a second beam pattern based on the output of analysis engine 120. Said another way, pattern optimizer 122 may determine that the first beam pattern should be modified in any one or more of the x, y, and z planes in order to better serve the UE types communicating with access point 114. The pattern optimizer 122 may determine the phase, amplitude, or power shift necessary for any one or more antenna elements of an antenna array associated with access point 114, to cause the antenna array to emit a second beam pattern. For example, in a case where the first beam pattern comprises multiple individually-identifiable beams, pattern optimizer 122 may determine a modification for the phase, amplitude, or power of at least one antenna element of an antenna array such that, when applied by access point 114, the first beam pattern switches to a second beam pattern such as a unified beam (e.g., a unified RF wavefront). Similarly, in a case where the first beam pattern comprises a unified beam, pattern optimizer 122 may determine a modification for the phase, amplitude, or power of at least one antenna element of an antenna array such that, when applied by access point 114, the first beam pattern switches to a second beam pattern such as multiple individually-identifiable beams (e.g., at least two individual beams). In some embodiments, determination of the phase, amplitude, or power modifications may comprise selection of a set of beam weights from a predetermined list of potential phase, amplitude, or power weights. In an embodiment, the list of potential phase, amplitude, or power weights may be based on phase, amplitude, or power weights applied to a similar antenna array in a testing environment. In an embodiment, the predetermined list of potential phase, amplitude, or power weights may be associated with optimal conditions for implementation, comprising at least one of: location of UEs, number of UEs, antenna array compatibility information, UE type, and balancing rules. Additionally, or alternatively, in some embodiments generation of the phase, amplitude, or power weights may comprise utilizing machine learning models for optimized beam patterns based on historical performance data associated with the location of UEs, number of UEs, and UE types.

Figure 2A:
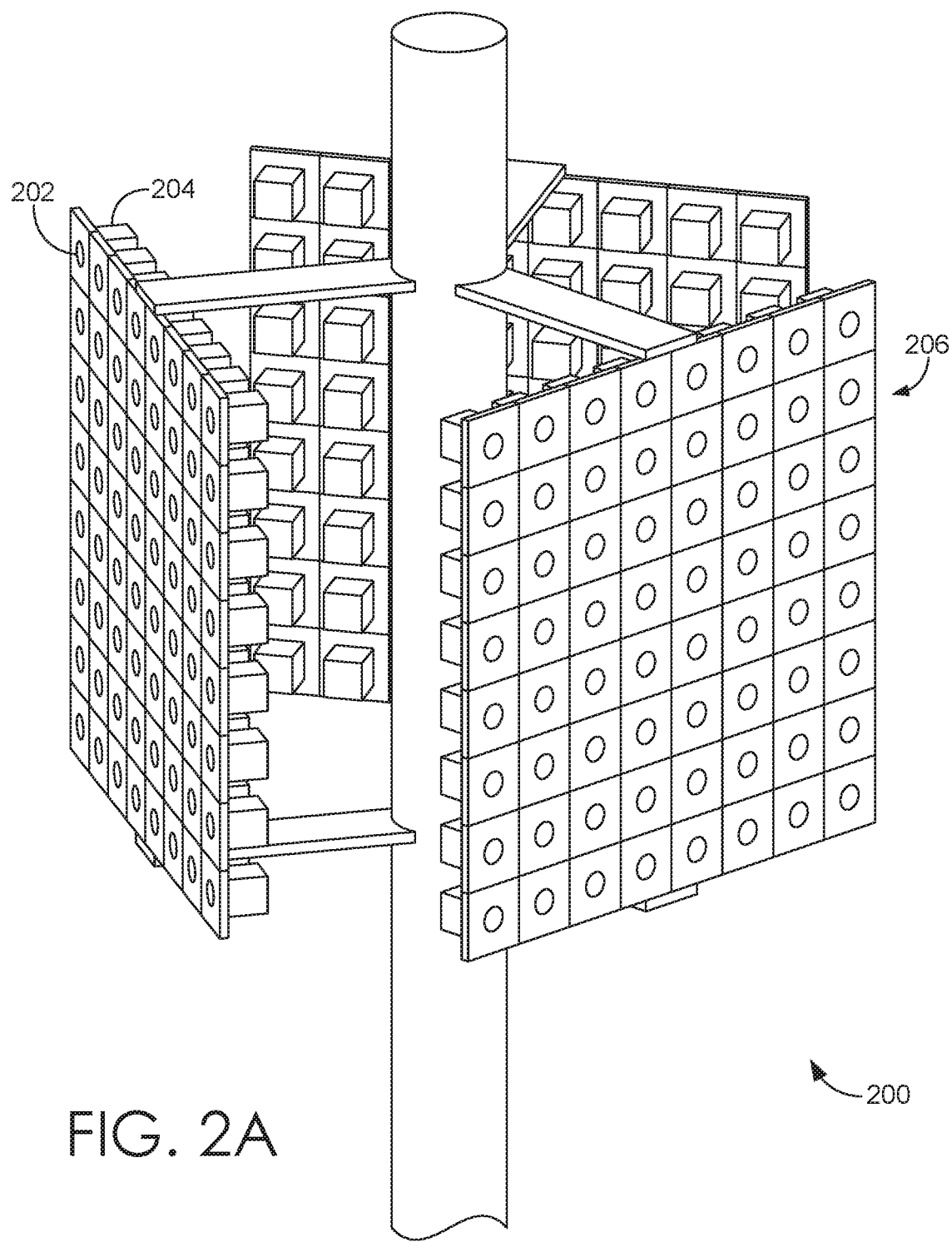
FIGS. 2A-2C each depict an example base station or access point configuration suitable to dynamically switch broadcast beam patterns, according to aspects described herein.
Figure 2B:
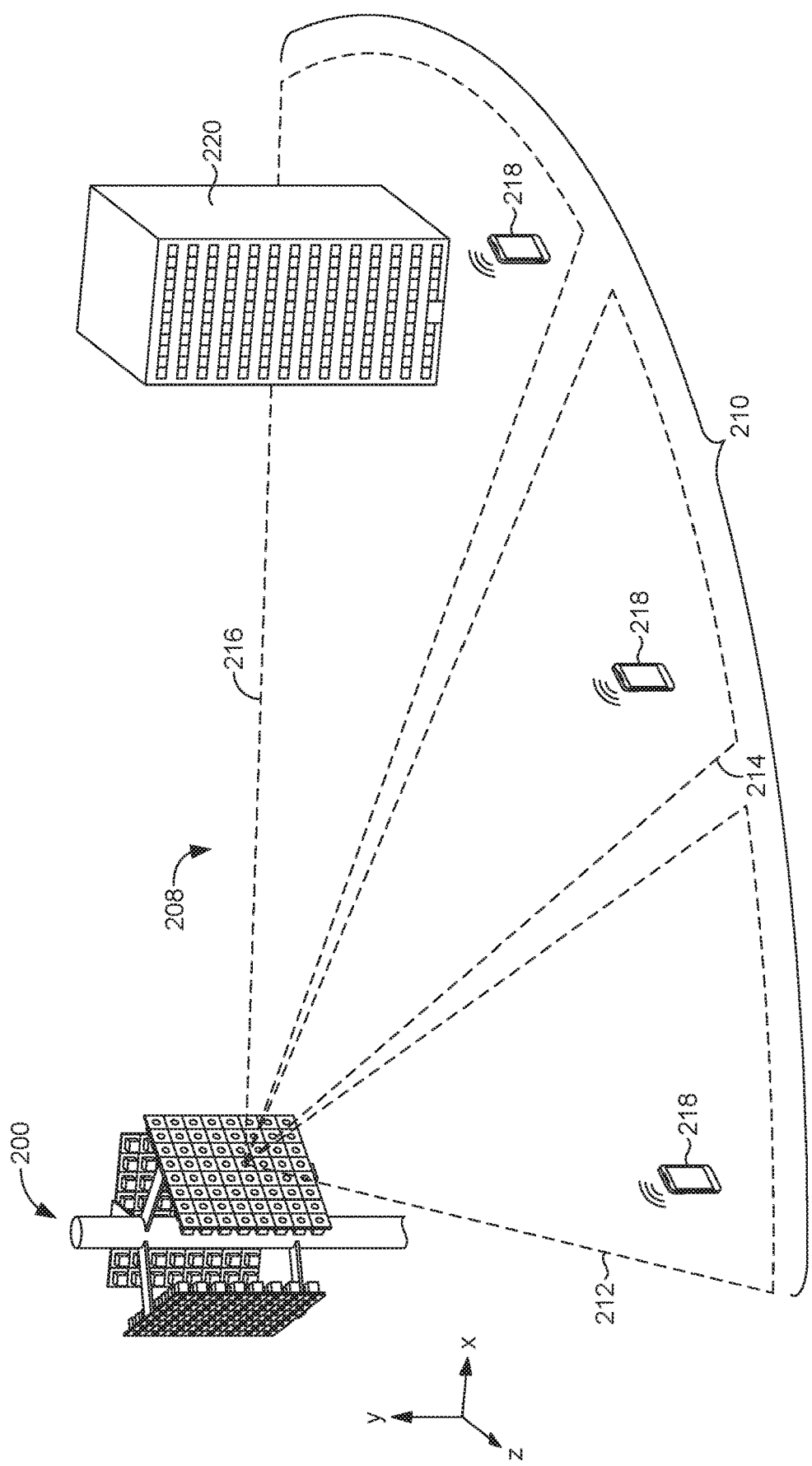
Figure 2C:
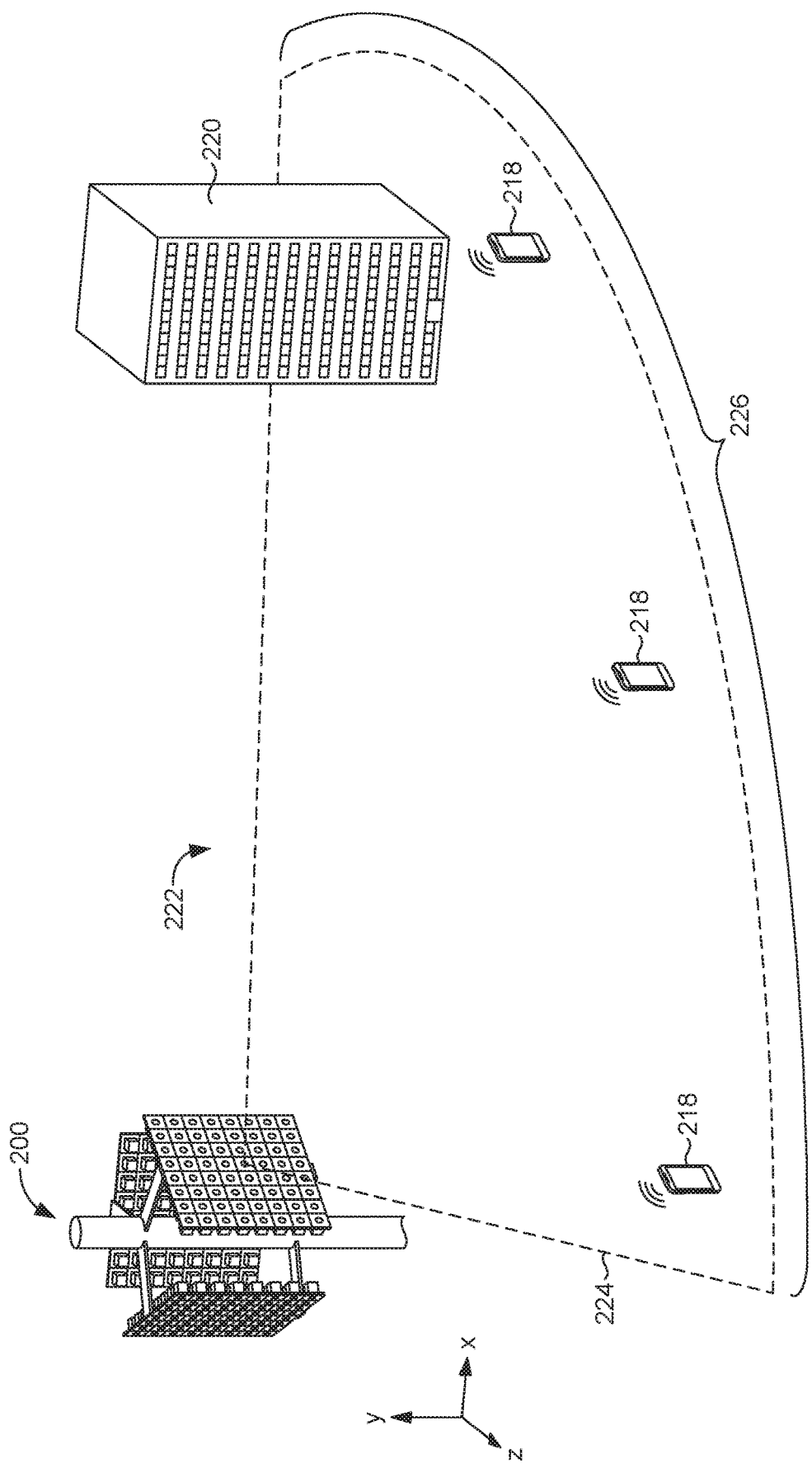

Turning now to FIGS. 2A, 2B, and 2C, an example access point configuration suitable for implementing aspects described herein is provided. Access point 200 is an illustrative example of a configuration that can facilitate dynamic beam pattern adjustments as described herein; however, the depiction of access point 200 is not intended to suggest limitations to the scope of the aspects described herein. Neither should the configuration be interpreted as having any dependency or requirement relating to any one or combination of components illustrated. As such, one skilled in the art will understand that many variations of access point 200 may be made based on the specific implementation or configuration of a particular access point or communication network in view of embodiments described herein.

Access point 200 comprises at least one antenna array 206, each antenna array having one or more antennas 202. In aspects, the one or more antennas 202 may be a dipole monopole, loop, parabolic, traveling-wave, aperture, yagi-uda, conical spiral, helical, conical, radomes, horn, or any combination thereof having a wavelength of ¼, ½, 1, or 1½ for example. In aspects, antenna array 206 may operate in networks such as 3G, 4G, 5G, and 802.11n, and utilize techniques such as MIMO, MU-MIMO, FD-MIMO, massive MIMO, or any combination thereof. It is noted that adjusting one or more of phase, amplitude, or power of at least one antenna of antenna array 206 can be broadly applicable to an antenna array targeting any portion of the RF spectrum (though any lower than VHF may be size prohibitive). In one aspect, the antenna may be configured to communicate in the UHF, SHF spectrum, or a combination thereof; for example, in the range of 1.3 GHz-30 GHz. Example antenna array 206 comprises 64 antennas 202 arranged in an 8×8 structure. In other embodiments, antenna array 206 may comprise antennas 202 arranged in an 8×4, 4×8, or 4×4 configuration. Each antenna 202 or set of antennas 202 of the antenna array 206 comprises a connection to other components of access point 200 that facilitate control of the phase, amplitude, power, or any combination thereof of RF signals emitted by the antenna(s).

Continuing with specific reference to FIG. 2B, an example beam pattern 208 for access point 200 is provided in accordance with aspects described herein. Beam pattern 208 comprises multiple individually-identifiable beams (e.g., beams 212, 214, 216) that facilitate network connectivity for UEs (e.g., user devices 218 and 220) in area 210. In some embodiments, multiple individually-identifiable beams comprise at least two beams. Beam pattern 208 can be a first beam pattern or a second beam pattern. Although beam pattern 208 is depicted as including a gap between beam 212 and beam 214 and a gap between beam 214 and 216, one skilled in the art will appreciate that these gaps are included to emphasize the distinction between beam pattern 208 and beam pattern 222. As such, the gaps are not necessary and may not exist in some embodiments. Said differently, in some implementations beam 212 can be adjacent beam 214 and beam 214 can be adjacent beam 218. Further, in some implementations the beams of beam pattern 208 can include incidental or intentional overlaps.

With specific reference to FIG. 2C, another example beam pattern 222 for access point 200 is provided in accordance with aspects described herein. The beam pattern 222 comprises a unified beam 224 that facilitate network connectivity for UEs (e.g., user devices 218 and 220) in area 226. Beam pattern 222 can be a first beam pattern or a second beam pattern.

Figure 3:
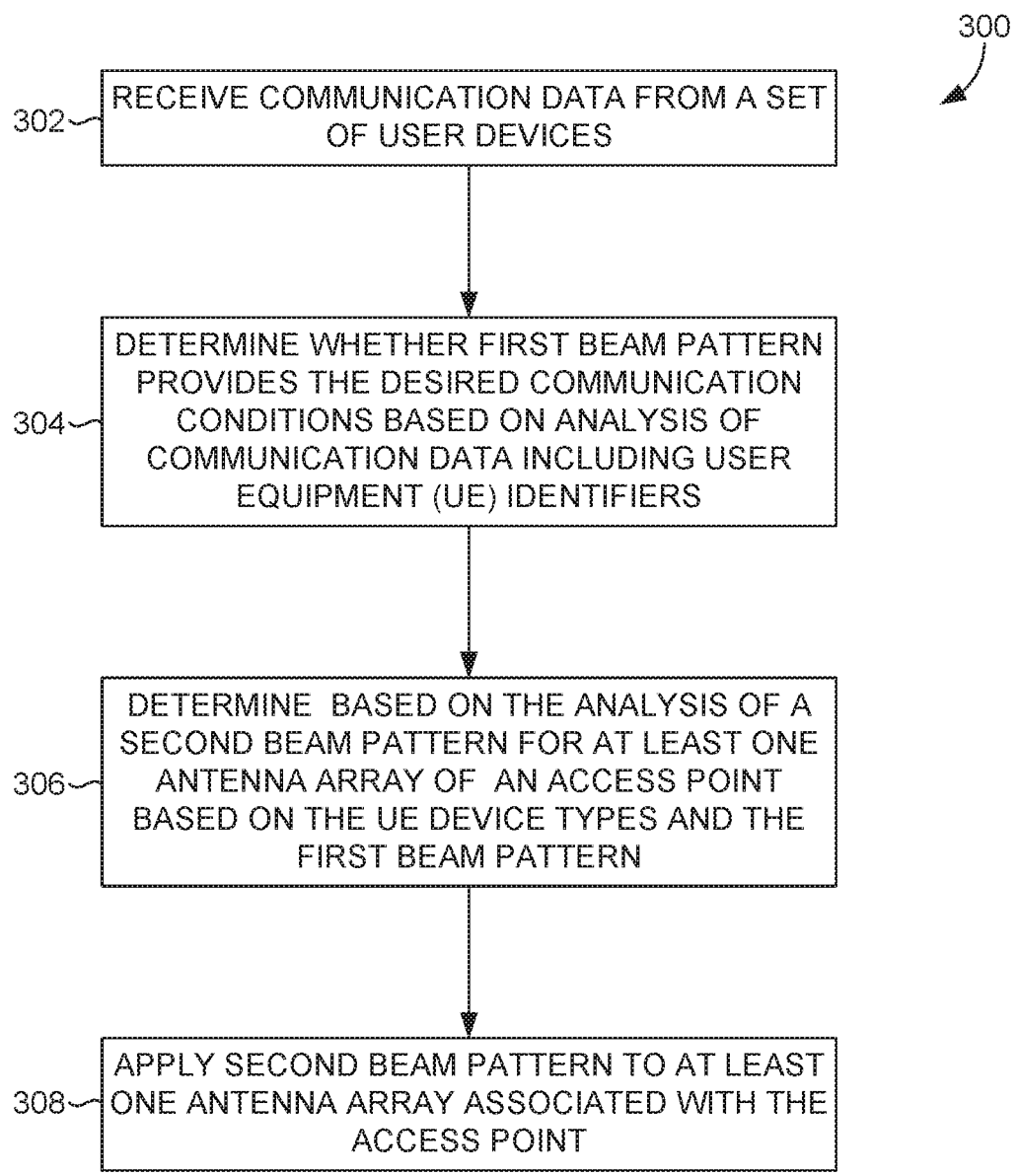
FIG. 3 depicts an example method for dynamically switching broadcast beam patterns based on reported user device types, according to aspects described herein.

Turning to FIG. 3, and with continued reference to FIGS. 2B and 2C, a method 300 for dynamically adjusting beam patterns of an antenna array associated with access point 200 is provided in accordance with aspects disclosed herein. In some embodiments, method 300 can be used for dynamic beam pattern switching in response to sub-optimal beam pattern performance for the UE types currently communicating with access point 200. Sub-optimal beam pattern performance may be detected and dynamic beam pattern switching activated by a specialized system, such as dynamic beam pattern allocation engine 112 described in relation to FIG. 1.

At block 302, communication data is received from a set of user devices. In general, communication data, such as UE type identifiers, are transmitted by each UE via an RF signal received by an antenna array associated with access point 200. For example, user devices 218 can transmit a UE type identifier embedded in a carrier signal. Similarly, user devices 220 can transmit another UE type identifier embedded in a carrier signal. Additionally, in some embodiments a user device (such as user devices 218 or user device 220) can also transmit a UE type identifier corresponding to UEs communicatively coupled to the user device. For an illustrative example, were a first user device is facilitating communications between a second user device and access point 200; the first user device can transmit the UE type identifier of the first user device and the second user device to access point 200. Said another way, a user device can act as a mobile hotspot for one or more other user devices or otherwise communicatively tether to one or more other user devices. The user device communicating with access point 200 can transmit its own UE type identifier and the UE type identifiers corresponding to the other user devices. Alternatively, in some embodiments a user device (such as user devices 218 or user device 220) can assign a UE type identifier to one or more other user devices. The assigned UE type identifiers can be transmitted by the user device, along with its own UE type identifier, to access point 200. In some embodiments, the UE type identifier includes any identifier that differentiates UEs that include at least one backhaul relay from UEs that do not include a backhaul relay. In some embodiments, the UE type identifier comprises a PLMN identifier (such as a PLMN of 310-830 or a PLMN of 310-120 for an illustrative example), a QCI identifier (such as QCI 6 or QCI 9 for an illustrative example). Some embodiments of block 302 are facilitated by a dynamic beam pattern allocation engine 112.

At block 304, communication data, such as UE type identifiers, is analyzed to determine whether a first beam pattern provides the desired communication conditions for the types of UEs (e.g., user devices 218 and 220) communicatively coupled with access point 200. Some embodiments of block 304 are facilitated by a dynamic beam pattern allocation engine 112. For example, the UE type identifiers received in block 302 can be analyzed to identify the various types of UE devices. The UE type identifiers corresponding to user devices 218 may be analyzed by dynamic beam pattern allocation engine 112. Based on the UE type identifier, user devices 218 can be identified as client devices (e.g., a first UE type). Similarly, the UE type identifiers corresponding to user device 220 may be analyzed by dynamic beam pattern allocation engine 112. Based on the UE type identifier, user device 220 can be identified as a relay device (e.g., a second UE type). For example, the UE type identifier associated with user devices 218 may be PLMN 310-120, QCI 9, another UE type identifiers, or any combination thereof. In contrast, the UE type identifier associated with user device 220 may be PLMN 310-830, QCI 6, another UE type identifier, or any combination thereof. Further, the UE type identifiers associated with any user devices (not depicted) connected with user device 220 or user devices 218 can be analyzed by dynamic beam pattern allocation engine 112. For example, user device 220 may assign a UE type identifier (such as QCI 5 or any other UE type identifier) to a user device connected to user device 220. Based on the assigned UE type identifier dynamic beam pattern allocation engine 112 can determine that three UE types are, directly or indirectly, communicating with access point 200.

Continuing, in some embodiments the current beam pattern (i.e., the first beam pattern) utilized by the antenna array associated with access point 200 that is facilitating communication with user devices 218, 220 and the user devices connected to user device 220 is identified and analyzed. Dynamic beam pattern allocation engine 112 can utilize a beam pattern monitor (such as beam pattern monitor 118 described in reference to FIG. 1) to detect the current broadcast mode or the amplitude, phase, and power associated with the particular antenna array of access point 200. Although the first beam pattern can be any beam pattern; for purposes of an illustrative example, dynamic beam pattern allocation engine 112 can identify that the detected broadcast mode or the amplitude, phase, and power of the antenna array indicate that the first beam pattern is beam pattern 208 comprising multiple individually-identifiable beams. At a different point in time the first beam pattern may be beam pattern 222 or any other beam pattern.

In some embodiments, the first beam pattern and UE types are compared to a predetermined set of rules. The predetermined set of rules may be determined by a telecommunication provider based on desired network performance. For example, one provider may determine that the presence of a UE type(s) that correspond to user devices that are associated with clients (e.g., paying subscribers) above a predetermined number are best served by a particular beam pattern (e.g., beam pattern 208 or beam pattern 222 or any other beam pattern) regardless of the presence of other UE types. For another example, it may be determined that the presence of UE types for clients equal to or below the predetermined number and the presence of a at least one UE type that corresponds to user devices that are associated with UE relays, fixed sensors, public hotspots, or any other non-client device are best served by second beam pattern (e.g., beam pattern 222 or beam pattern 208 or any other beam pattern). Similarly, the presence of UE types that correspond to assigned UE types (such as those assigned to user devices by another user device that is facilitating communication with access point 200) may be best served by a particular beam pattern (e.g., beam pattern 208 or beam pattern 222 or any other beam pattern). For another example, it may be determined that the presence of a number of UEs with a specific UE type (such as PLMN 310-830) greater than a predetermined UE type specific threshold and a network utilization threshold (such as >50% of the physical resource blocks (PBR)). Said differently, the predetermined set of rules can comprise comparing the number of UEs of a particular type to a UE threshold and comparing the utilization of resource capacity of the beam(s) facilitating communication with the UEs to a utilization threshold hold. It will be understood by those skilled in the art that these are merely illustrative examples, and not intended to limit the scope of the embodiments described herein. For example, a given predetermined rule as such, the predetermined set of rules can include any combination of logic rules at least partially based on UE type identifiers and beam pattern.

At block 306, a second beam pattern for at least one antenna array of an access point is determined based on the analysis of the UE device types and the first beam pattern. In some embodiments, determination or generation of a second beam pattern occurs in response to dynamic beam pattern allocation engine's 112 analysis in block 304 indicating that the first beam pattern is not the optimal or is otherwise unacceptable for the UE types currently communicating with access point 200. Said differently, in some embodiments dynamic beam pattern allocation engine 112 generates, determines, applies, or activates a second beam pattern in response to the determination that the first beam pattern violates at least one predetermined rule related to UE device type based beam pattern optimization.

The determination or generation of a second beam pattern comprise comparing the predefined broadcast mode or phase, amplitude, and power for the first beam pattern of the antenna array facilitating communication between user devices 218, 220 and access point 200 with a predetermined list comprising potential phase, amplitude, and power weights or the predefined broadcast modes for the antenna array. In some embodiments, the second beam pattern is generated based on a set of rules that evaluate the UE types and the predetermined list to identify the optimal phase, amplitude, and power weights or the predefined broadcast mode for the current conditions. Additionally, or alternatively, generating the second beam pattern comprises comparing the antenna array settings of the first beam pattern to phase, amplitude, and power weights determined by machine learned models trained to optimize network performance at least partially based on UE type. In some embodiments, the generated or determined second beam pattern comprise a modification of at least one value associated with the phase, amplitude, or power for at least one antenna of the antenna array facilitating communication between the user devices 218, 220 and access point 200. For example, dynamic beam pattern allocation engine 112 can generate the second beam pattern by modifying the phase, amplitude, or power for an antenna, row of antennas, column of antennas, set of antennas, or any combination thereof.

At block 308, the second beam pattern is applied to at least one antenna array associated with access point 200. Applying the second beam pattern can comprise dynamic beam pattern allocation engine 112 communicating instructions that when executed by access point 200 cause the wavefront emitted by an antenna array to switch from the first beam pattern to the second beam pattern. For an illustrative example, dynamic beam pattern allocation engine 112 can communicate instructions to access point 200 that cause the beam pattern to switch between beam pattern 208 and beam pattern 222 or switch between beam pattern 222 and beam pattern 208. In some embodiments, the switch from the first beam pattern to the second beam pattern is nearly instantaneous as governed by speed of computer processing, the physical and chemical properties of the antenna array, and the physical properties of RF wavefronts.

Some embodiments of method 300 comprise additional and or alternative blocks. For example, some embodiments of block 308 further comprise returning to block 302. As such, it will be understood by those skilled in the art that method 300 may be repeated periodically, intermittently, continuously, or on demand to facilitate dynamic beam pattern optimization based at least partially on UE types. Further, some embodiments of method 300 may wait a predetermined period of time after block 308 and reapply the original beam pattern (e.g. the first beam pattern) or a default beam pattern. The predetermined period of time may vary based on context. For example, a predetermined period of time may be based on the location of the access point 200, historical data related to UE type communication patterns, or any other metric deemed relevant by the operators of access point 200.

Figure 4:
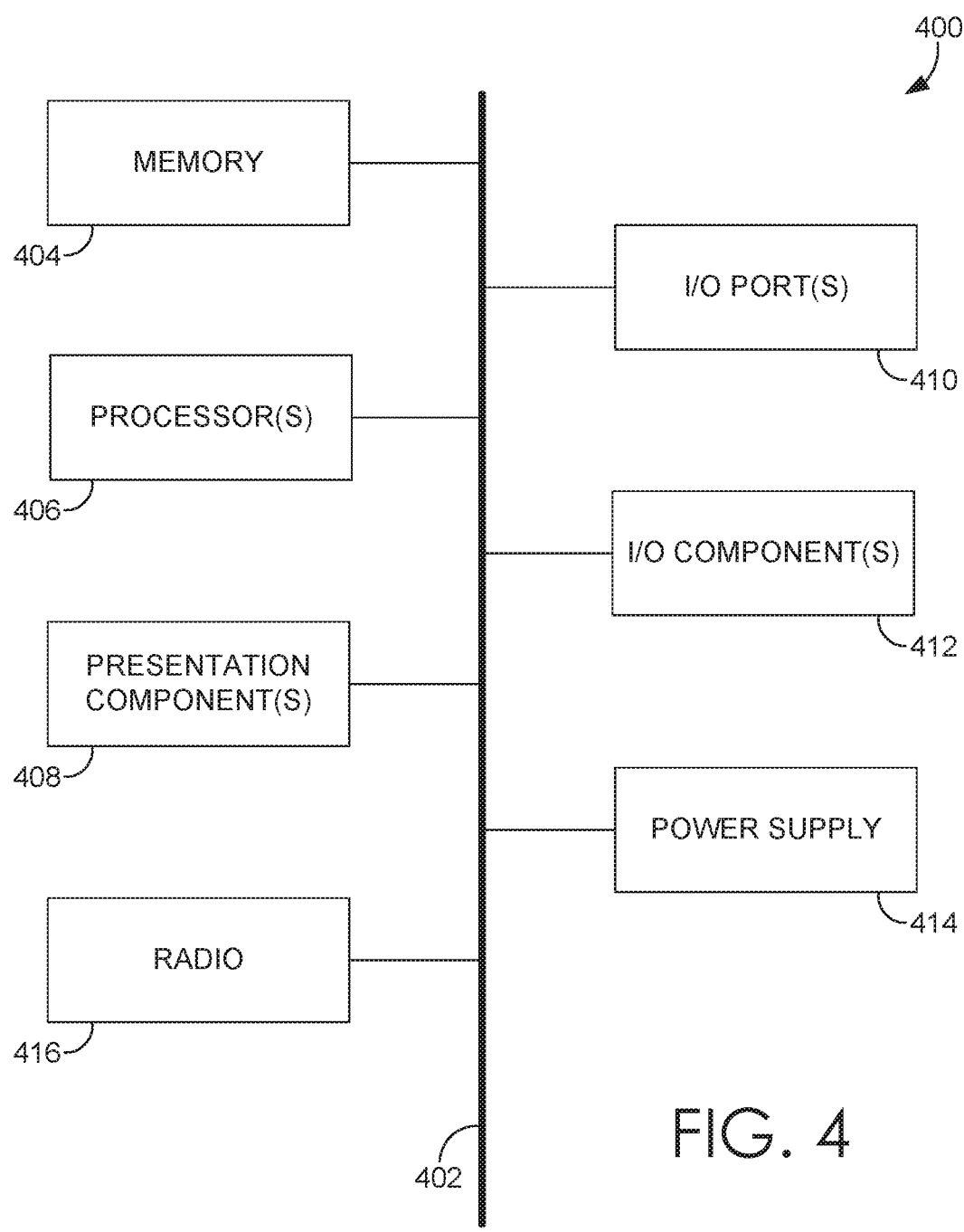
FIG. 4 depicts a block diagram of an example computing environment suitable for use in implementing embodiments herein.

With reference to FIG. 4, computing device 400 includes a bus 402 that directly or indirectly couples the following devices: memory 404, one or more processors 406, one or more presentation components 408, input/output (I/O) ports 410, input/output components 412, and an illustrative power supply 414. Bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an example computing device that can be used in connection with one or more embodiments of the present invention. Distinction is not made between such categories as "workstation," "server," "laptop," "handheld device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 404 includes computer-storage media in the form of volatile and/or nonvolatile memory. The memory may be removable, non-removable, or a combination thereof. Example hardware devices include solid-state memory, hard drives, optical-disc drives, etc. Computing device 400 includes one or more processors that read data from various entities such as memory 404 or I/O components 412. Presentation component(s) 408 present data indications to a user or other device. Example presentation components include a display device, speaker, printing component, vibrating component, etc.

I/O ports 410 allow computing device 400 to be logically coupled to other devices including I/O components 412, some of which may be built in. Illustrative components include a microphone, joystick, game pad, satellite dish, scanner, printer, wireless device, etc.

Radio 416 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, 5G, or other VoIP communications. As can be appreciated, in various embodiments, radio 416 can be configured to support multiple technologies and/or multiple radios can be utilized to support multiple technologies.

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

The invention claimed is:
1. A method of dynamic beam pattern switching based on device type, the method comprising:
   receiving, from a plurality of user devices, a device type indication corresponding to each device of the plurality of user devices wherein a set of signals transmitted to the plurality of user devices has a first broadcast beam pattern;

determining, based on the device type indication, that at least one of the plurality of user devices is a relay; and in response to the determination, modifying one or more transmission characteristics of the first broadcast beam pattern to transmit a second set of signals having a second broadcast beam pattern, wherein one of the first or the second broadcast beam pattern comprises a sector beam and wherein the first broadcast beam pattern is different than the second broadcast beam pattern.

2. The method of claim 1, further comprising:

classifying the plurality of user devices based on a predetermined set of rules defining at least two device types by a corresponding device type indication, wherein a first device type of at least two device types comprises the relay; and responsive to and based on the classifying of the plurality of user devices using the predetermined set of rules, generating the second broadcast beam pattern.

3. The method of claim 1, wherein the device type indication comprises a public land mobile network number or quality of service class identifier.

4. The method of claim 1, wherein the relay provides a backhaul connection for a user device to an access point.

5. The method of claim 4, wherein determining the second broadcast beam pattern comprises identifying how to modify at least one phase, amplitude, or power of at least one antenna to change the first broadcast beam pattern to the second broadcast beam pattern.

6. The method of claim 1, wherein the first broadcast beam pattern comprises a multi-beam broadcast beam pattern.

7. The method of claim 1, wherein the first broadcast beam pattern comprises a single beam broadcast beam pattern.

8. A system for dynamic beam pattern switching based on device type, the system comprising:

a base station comprising at least a first antenna array for communicating with a plurality of user devices, wherein the first antenna array is configured to broadcast a radio frequency wave front in a first broadcast beam pattern to transmit a first set of signals;

a beam pattern allocation component communicatively coupled with the base station, wherein the beam pattern allocation component includes computer readable media storing executable instructions that when executed by the beam pattern allocation component cause the beam pattern allocation component to perform operations including:

receiving a device type indication corresponding to each device of the plurality of user devices;

determining, based on the device type indication, that at least one of the plurality of user devices is a relay; and in response to the determination, modifying one or more transmission characteristics of the first broadcast beam pattern to transmit a second set of signals having a second broadcast beam pattern, wherein one of the first or the second broadcast beam pattern comprises a sector beam and wherein the first broadcast beam pattern is different than the second broadcast beam pattern.

9. The system of claim 8, wherein the beam pattern allocation component is configured further to detect a current broadcast beam pattern for the base station, wherein the beam pattern allocation component is configured to determine the first broadcast beam pattern is also based on the current broadcast beam pattern.

10. The system of claim 8, wherein the device type indication comprises a public land mobile network number or quality of service class identifier.

11. The system of claim 8, wherein the relay provides a backhaul connection for a user device to an access point.

12. The system of claim 11, wherein the beam pattern allocation component is configured to determine the second broadcast beam pattern comprises the beam pattern allocation component is configured to identify how to modify at least one phase, amplitude, or power of at least one antenna associated with the base station to change the first broadcast beam pattern to the second broadcast beam pattern.

13. The system of claim 8, wherein the first broadcast beam pattern comprises a multi-beam broadcast beam pattern.

14. The system of claim 8, wherein the first broadcast beam pattern comprises a single beam broadcast beam pattern.

15. One or more non-transitory computer-readable storage media having computer-executable instructions embodied thereon that, when executed, perform a method for dynamic beam pattern switching based on a device type, the method comprising:

establishing communication with each device of a plurality of user devices via an antenna array utilizing a first broadcast beam pattern to transmit a first set of signals;

receiving a device type indication from each device of the first plurality of user devices;

determining, based on the device type indication, that at least one of the plurality of user devices is a relay; and in response to the determination, modifying one or more transmission characteristics of the first broadcast beam pattern to transmit a second set of signals having a second broadcast beam pattern, wherein one of the first or the second broadcast beam pattern comprises a sector beam and wherein the first broadcast beam pattern is different than the second broadcast beam pattern.

16. The one or more non-transitory computer-readable storage media of claim 15, wherein the executable instructions further comprise detecting a current broadcast beam pattern for a base station, wherein determining the first broadcast beam pattern is also based on the current broadcast beam pattern.

17. The one or more non-transitory computer-readable storage media of claim 15, wherein the device type indication comprises a public land mobile network number or quality of service class identifier.

18. The one or more non-transitory computer-readable storage media of claim 15, wherein the relay provides a backhaul connection for a user device to an access point.

19. The one or more non-transitory computer-readable storage media of claim 18, wherein determining the second broadcast beam pattern comprises identifying how to modify at least one phase, amplitude, or power of at least one antenna associated with a base station to change the first broadcast beam pattern to the second broadcast beam pattern.

20. The one or more non-transitory computer-readable storage media of claim 15, wherein the first broadcast beam pattern comprises a multi-beam broadcast beam pattern or single beam broadcast beam pattern.

* * * * *